(12) United States Patent
Radomsky et al.

(10) Patent No.: US 6,701,094 B1
(45) Date of Patent: Mar. 2, 2004

(54) BATTERY-POWERED IR TRANSMITTER HAVING CONSTANT POWER OUTPUT

(75) Inventors: Israel Radomsky, Herzelia (IL); Israel Abrams, Kfar Saba (IL); Yossef Bruslavsky, Raanana (IL)

(73) Assignee: Elpas Electro-Optic Systems Ltd., Raanana (IL)

( * ) Notice: Subject to any disclaimer, the term of this patent is extended or adjusted under 35 U.S.C. 154(b) by 0 days.

(21) Appl. No.: 09/471,144

(22) Filed: Dec. 23, 1999

(30) Foreign Application Priority Data

Nov. 7, 1999 (IL) .................................................. 132787

(51) Int. Cl.[7] .............................................. H04B 10/04
(52) U.S. Cl. ...................... 398/182; 398/106; 398/140; 340/384.72; 340/312; 250/199
(58) Field of Search ................................ 359/180, 142, 359/152; 340/312, 384.72; 250/199

(56) References Cited

U.S. PATENT DOCUMENTS

| | | | | |
|---|---|---|---|---|
| 4,150,284 A | * | 4/1979 | Trenkler et al. ............. | 359/142 |
| 4,151,407 A | | 4/1979 | McBride et al. ............. | 398/182 |
| 4,275,385 A | * | 6/1981 | White ..................... | 250/338.1 |
| 5,142,396 A | * | 8/1992 | Divjak et al. ........... | 340/825.72 |
| 5,818,328 A | * | 10/1998 | Anderson et al. ...... | 340/384.72 |
| 6,211,790 B1 | * | 4/2001 | Radomsky et al. ...... | 340/573.4 |

OTHER PUBLICATIONS

Martin, Brian W., "Watchit. A Fully Supervised Identification, Location and Tracking System." Proceedings of the Annual International Carnahan Conference on Security Technology, US, New York, IEEE, vol. Conf. 29, Oct. 18, 1995, pp. 306–310, XP000585871.

* cited by examiner

*Primary Examiner*—Leslie Pascal
*Assistant Examiner*—David C Payne
(74) *Attorney, Agent, or Firm*—Browdy and Neimark, P.L.L.C.

(57) ABSTRACT

In a battery operated IR transmitter having at least one IR LED energized by a source of voltage for passing current during transmission of pulses of data, the IR transmitter includes an energy regulator for maintaining transmission energy through the at least one IR LED substantially constant regardless of fluctuations in the voltage. The current is passed for a time duration that increases as the voltage decreases, the time duration being a function of the voltage so as to maintain the transmission energy substantially constant.

6 Claims, 9 Drawing Sheets

IR Modulation Scheme (ASK OOK) of a word in motion & motionless

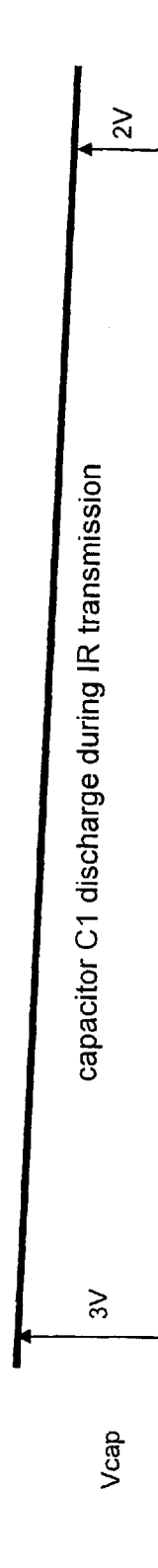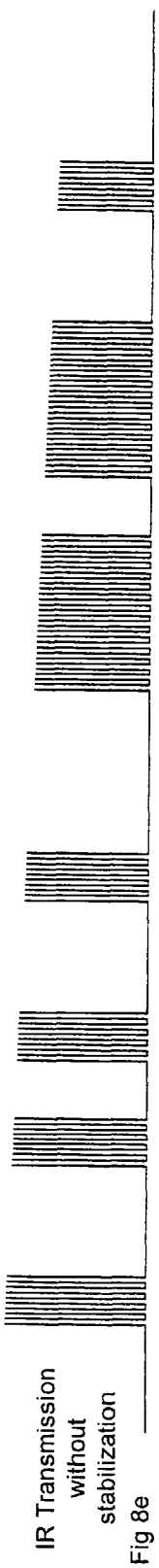

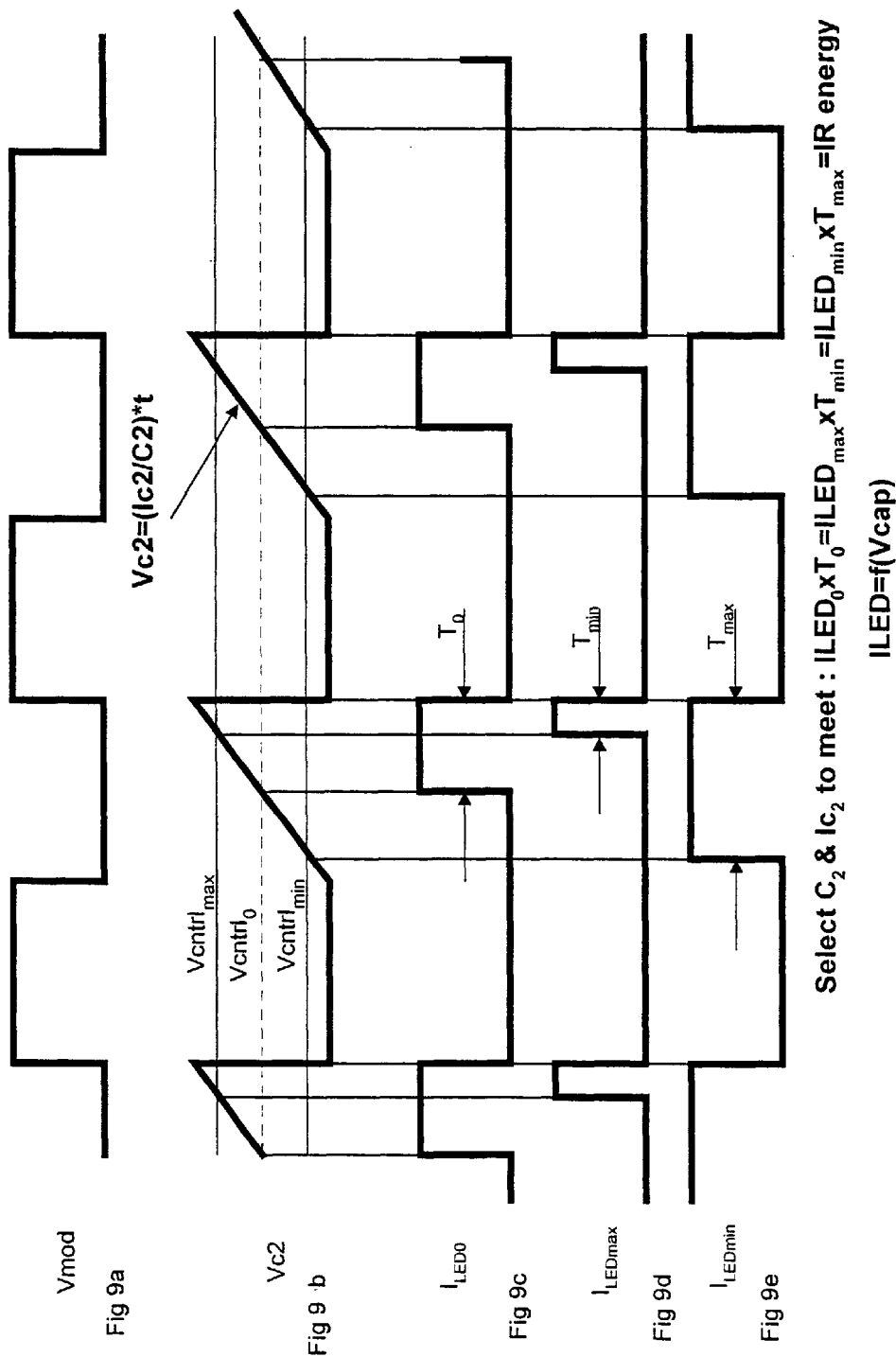

BATTERY-POWERED IR TRANSMITTER HAVING CONSTANT POWER OUTPUT

FIELD OF THE INVENTION

This invention relates to portable, battery-operated infrared transmitters such as, for example, IR badges and IR remote control devices.

BACKGROUND OF THE INVENTION

The principle of operation of IR transmitters in IR badges and remote control devices, for example, is that modulated data may be transmitted by an IR LED array so that the light signal transmitted thereby may be received by an IR receiver in line-of-sight relationship with the IR transmitter. The range of such devices is thus a function of the light energy emitted by the LED array in the IR transmitter and this, in turn, depends on the battery voltage. Since portable IR transmitters are, by their very nature, powered by an internal battery this means that the signal strength tends to become weaker as the battery discharges. This, in turn, results in the range of the transmitter decaying as the battery ages, thus requiring, that the IR transmitter be brought into closer proximity to the IR receiver in order to be effective or, alternatively, that the battery be replaced even before the end of its effective lifetime. Neither alternative is ideal.

Yet another even more serious drawback relates to the fact that, in order to allow for effective IR transmission over the desired range of approximately of 30 m, the currents flowing through the diodes in the LED array must be relatively high. Since such devices are by their nature used to transmit very short intermittent bursts of data, the design is based on charging capacitors during the time interval between transmissions, whereby upon transmission the capacitors are discharged giving rise to relatively high currents which are significantly larger than the short circuit current of the battery. During discharge of the capacitor, the voltage across the capacitor falls and so too, therefore, does the transmission power, which is thus not constant even during transmission of a short pulse. This gives rise to serious problems in implementation.

SUMMARY OF THE INVENTION

It is therefore an object of the present invention to provide a battery operated IR transmitter comprising at least one IR LED energized by a source of voltage for passing current during transmission of pulses of data, said IR transmitter including an energy regulator for maintaining transmission energy through the at least one IR LED substantially constant regardless of fluctuations in said voltage.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 8a to 8f show pictorially various waveforms associated with an OOK modulation scheme used by the badge according to the invention;

FIGS. 9a to 9e show pictorially various voltage and current waveforms associated with IR energy stabilization in the badge according to the invention;

DETAILED DESCRIPTION OF A PREFERRED EMBODIMENT

Figure 1:
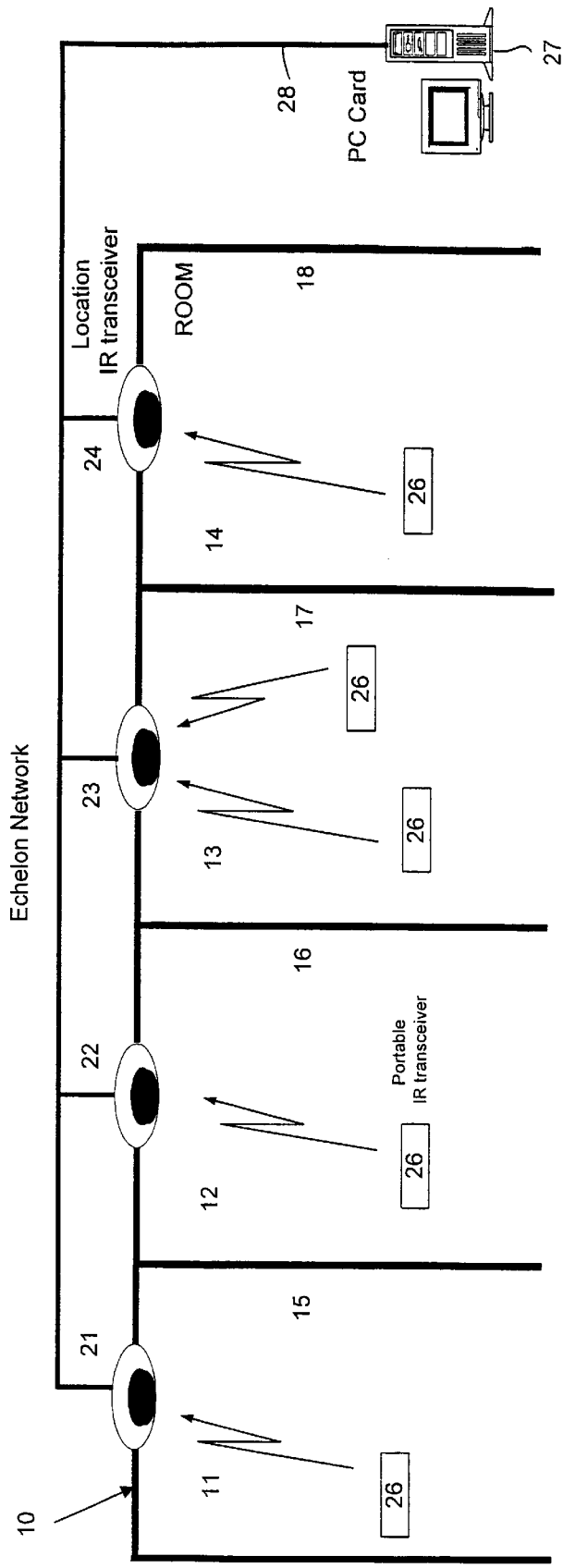
FIG. 1 shows pictorially an IR location system employing portable IR badges with integral motion sensors.

FIG. 1 shows a pictorial representation of a geographical area depicted generally as 10 comprising four separate and mutually adjacent rooms 11, 12, 13 and 14. In each of the four rooms 11 to 14 there is mounted on the ceiling a corresponding reader 21, 22, 23 and 24 constituting a location receiver which allows reception of data using IR transmission. Also shown in each room one or more portable IR badges 26 which can be worn by a person and transmit data to a nearby reader. A server 27 is connected to the IR readers 21, 22, 23 and 24 via a LONTALK network 28 and is responsive to signals generated by the readers 21, 22, 23 and 24 for reception and monitoring the transmissions of the IR badges. LONTALK is a registered trademark of the Echelon Corporation.

Figure 2:
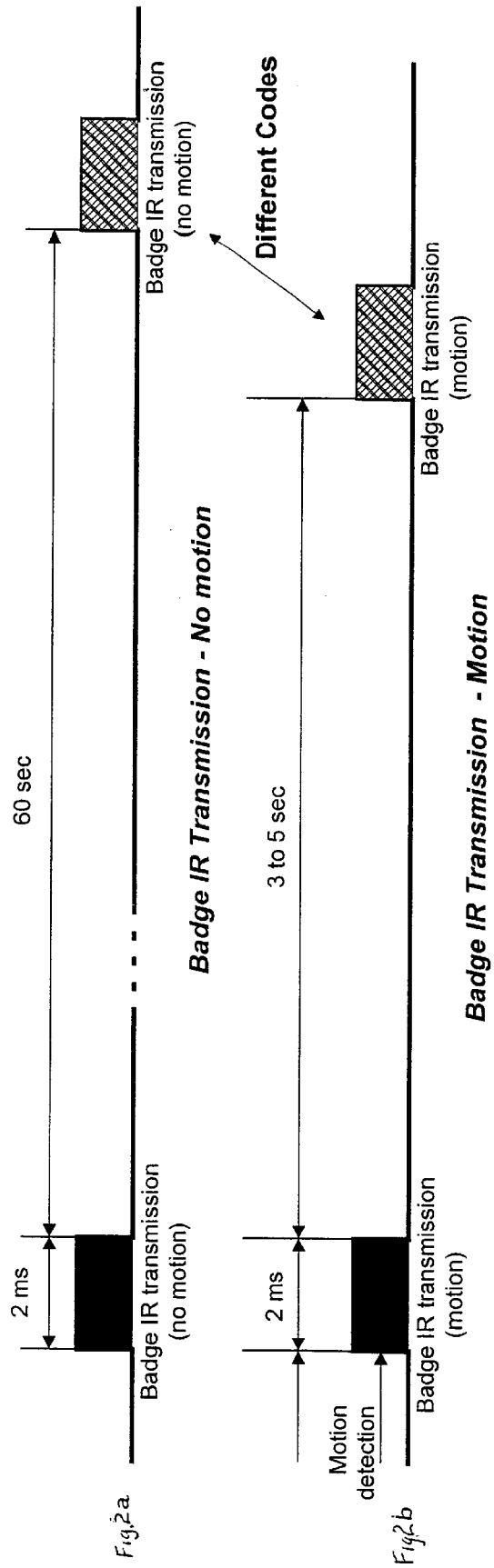
FIGS. 2a and 2b show details of an IR transmission protocol in motion and motionless states, respectively.

FIG. 2a shows pictorially a detail of the IR transmission protocol when the badge is stationary. A 2 ms pulse is transmitted by the badge once every 60 seconds. This signal serves merely to inform the readers 21 to 24 that the badge is active and within range. As shown in FIG. 2b, when the badge moves, the frequency transmission is increased so that a 2 ms pulse is transmitted randomly once every three to five seconds. In both cases, the data pulse transmitted by the badge is encoded with the badge ID so that the reader can determine from which badge the data is transmitted and thereby establish the location thereof. By varying the data transmission rate from sparse transmission when the badge is motionless to more frequent transmission when it is subject to movement, battery consumption may be significantly reduced when the badge is dormant for extended periods of time. The transmitted pulse is encoded to indicate either "motion" or "motionless" status of the badge. The server 27 receives the badge's status via the network 28 and utilizes the badge's status (i.e. "motion" or "motionless") in order to perform different services for the person wearing the badge, according to its status.Owing to the very small time slot during which a stationary badge transmits as a proportion of the overall cycle between successive transmissions, the likelihood of two stationary badges attempting to transmit during the identical 2 ms period is negligible. When the badges move, the time interval between successive transmissions is randomly varied between 3 and 5 seconds. Thus, here too, the risk of two or more badges attempting to transmit within the same time slot may be sufficiently reduced. Obviously, conventional data collision techniques requiring re-transmission of data may be employed in the event that, notwithstanding efforts to the contrary, two different badges are transmitted simultaneously.

Figure 3:
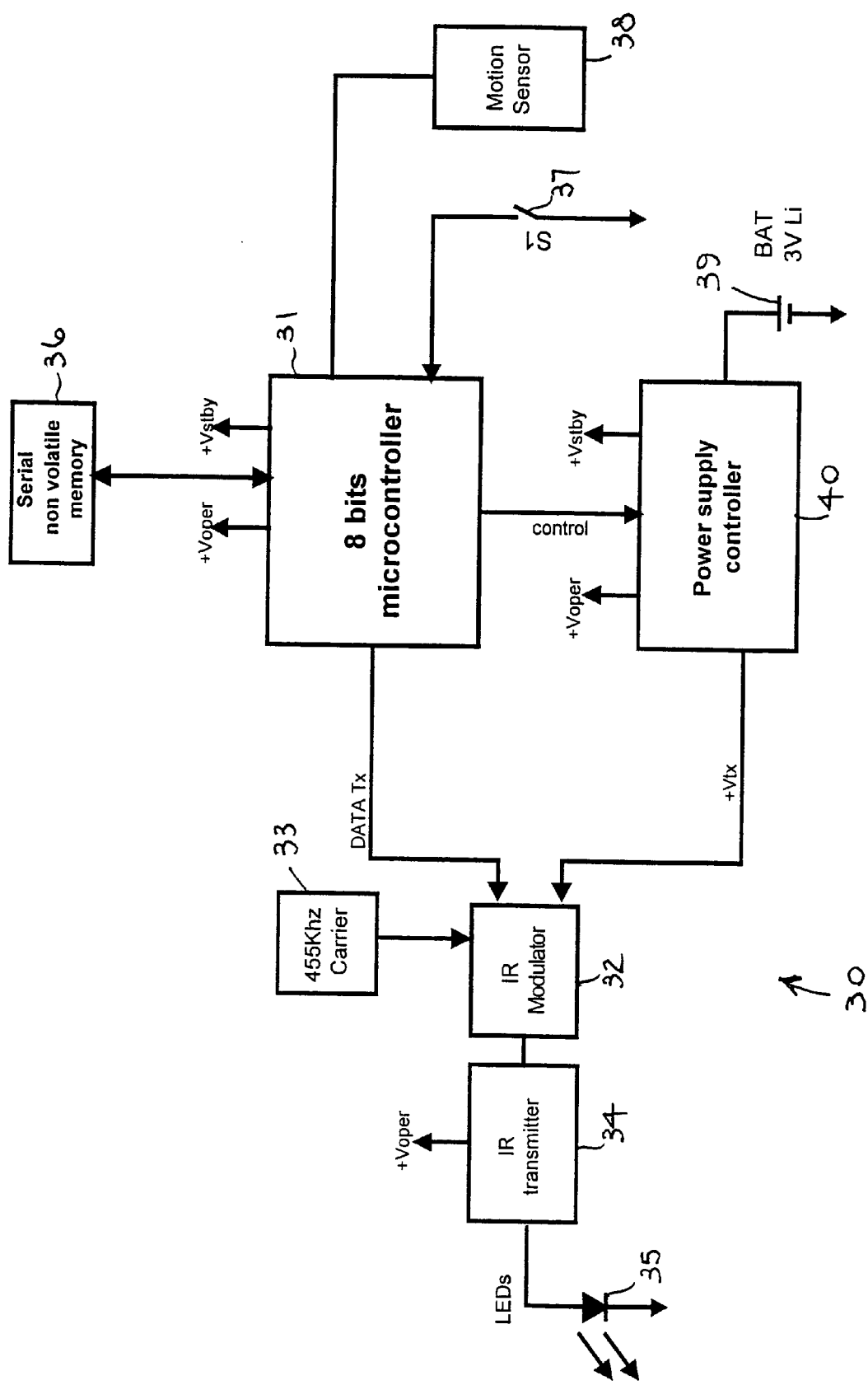
FIG. 3 is a block diagram showing functionally a portable badge transmitter for employing the method of the invention.
Figure 4:
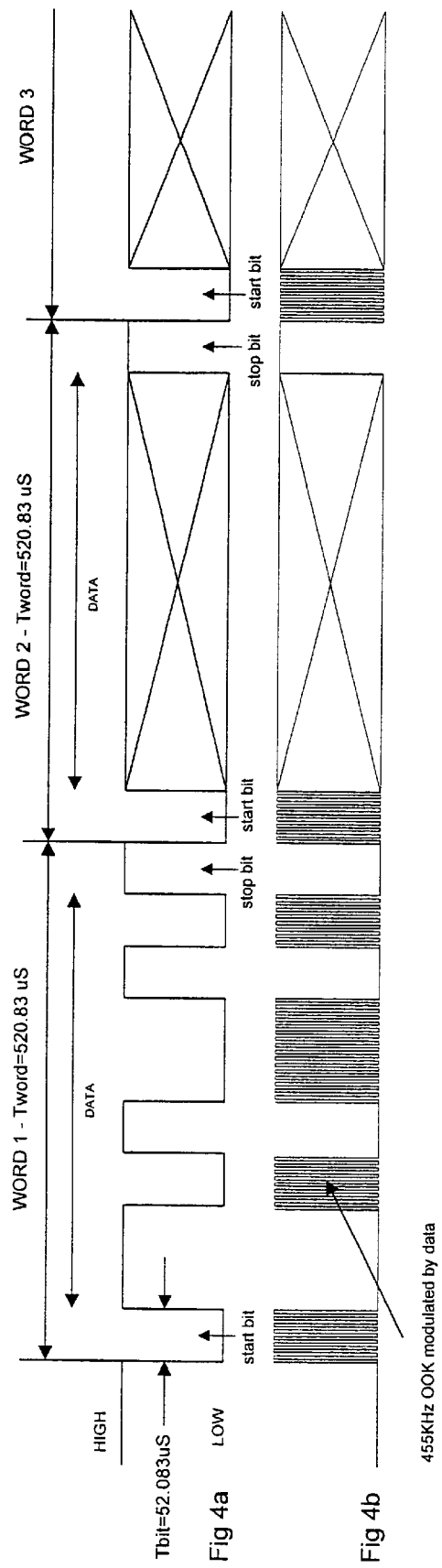
FIGS. 4a and 4b show pictorially a modulation scheme for use with the IR badge according to the invention.

FIG. 3 is a block diagram showing those details of a badge depicted generally as 30 relating to data transmission to one of the ceiling-mounted readers 21, 22, 23 and 24 shown in FIG. 1. A micro-controller 31 is coupled to an IR modulator 32 and operates in accordance with a stored instruction set defining communications protocols allowing messages to be communicated between the badge and reader. Thus, an IR signal representative of data is fed by the micro-controller 31 to an IR modulator 32 for modulating the IR signal with a 455 KHz carrier 33. An IR transmitter 34 is coupled to the IR modulator 32 for transmitting the modulated data signal via an array of LEDs 35 connected to the micro-controller 31. The communications protocol is not itself a feature of the invention but is described briefly with particular reference to FIG. 4 of the drawings. Coupled to the micro-controller 31 is a non-volatile memory 36 for a unique badge ID as well as other badge parameters. Likewise, at least one manual pushbutton switch 37 is coupled to the micro-controller 31 and allows a respective command to be sent for alerting a reader that the badge wearer requires some service at the badge's location. A motion sensor 38 is coupled to the micro-controller 31 for feeding thereto a motion signal when the badge is moved. This signal causes the badge to transmit its data at a higher rate and prolongs battery life, since only relatively sparse transmission is required when the badge is stationary. The badge circuitry is powered by a 3 volt lithium battery 39 connected to the micro-controller 31 and the IR transmitter 34 via a power supply controller 40.

FIG. 4a shows the IR modulation scheme employing on-off keying (00K) modulation of the 455 KHz pulse train constituting the modulated carrier transmitted by the reader. A high logic level constituting logic "1" is thus represented by an absence of data whereas a low logic level (logic "0") results in a modulated pulse being transmitted by the reader to the badge.

FIG. 4b shows a message transmitted by the badge to the reader comprising a 455 KHz OOK modulated by a plurality of data words.

Figure 5:
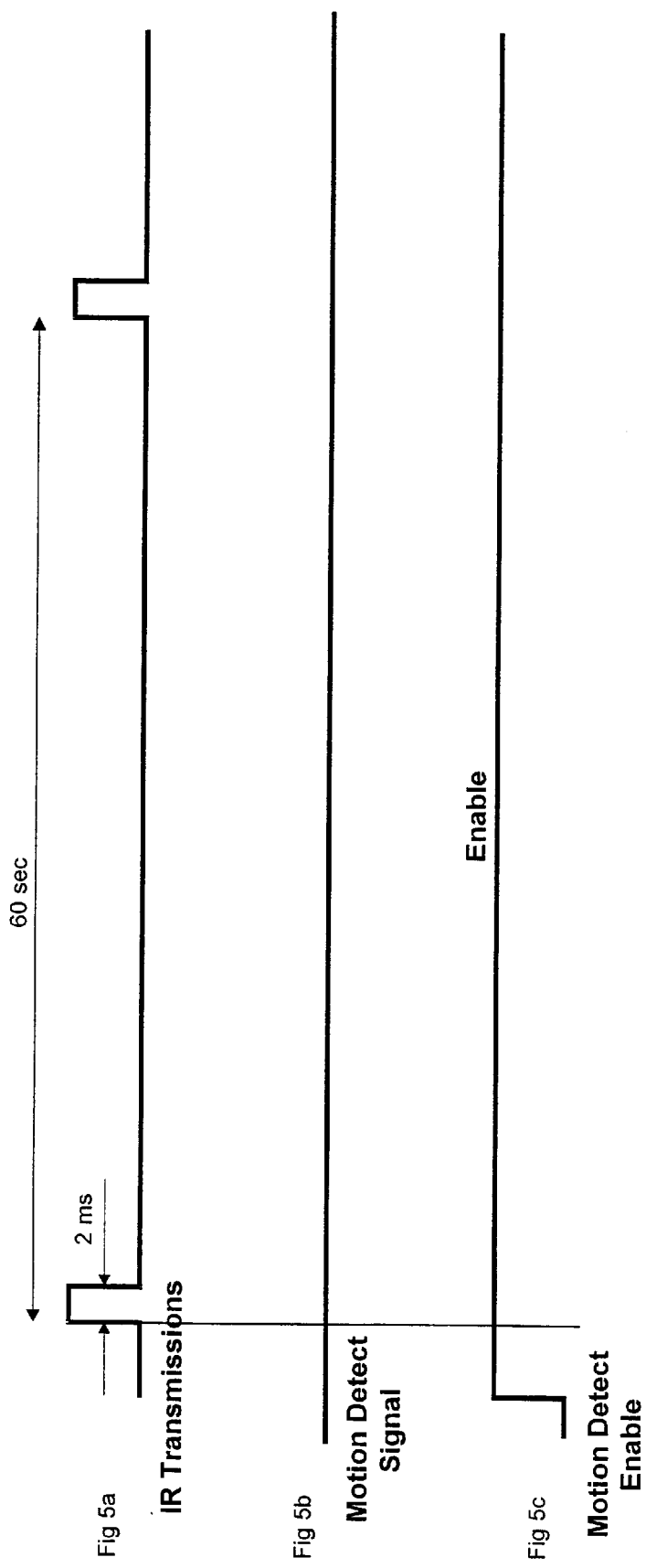
FIGS. 5a, 5b and 5c shows details of the data communications protocol upon motion detection.

FIGS. 5a to 5c show timing diagrams relating to the transmission of IR signals by the badge prior to motion detection. When motion detection is enabled, a motion detect enable signal is set to ENABLED as shown in FIG. 5c and remains ENABLED for so long as no motion is detected. As shown in FIG. 5a, in the absence of motion, the IR transmitter 34 in the badge 30 shown in FIG. 3 transmits a short pulse of time duration equal to 2 ms. The IR signals serve as "I'm alive" signals showing that the badge is energized and functional. The period between adjacent pulses by the IR transmitter is 60 s, during which period the transmitters are idle, thereby saving battery consumption. In the absence of any motion, the motion detect signal remains constant at 0 volt as shown in FIG. 5b.

Figure 6:
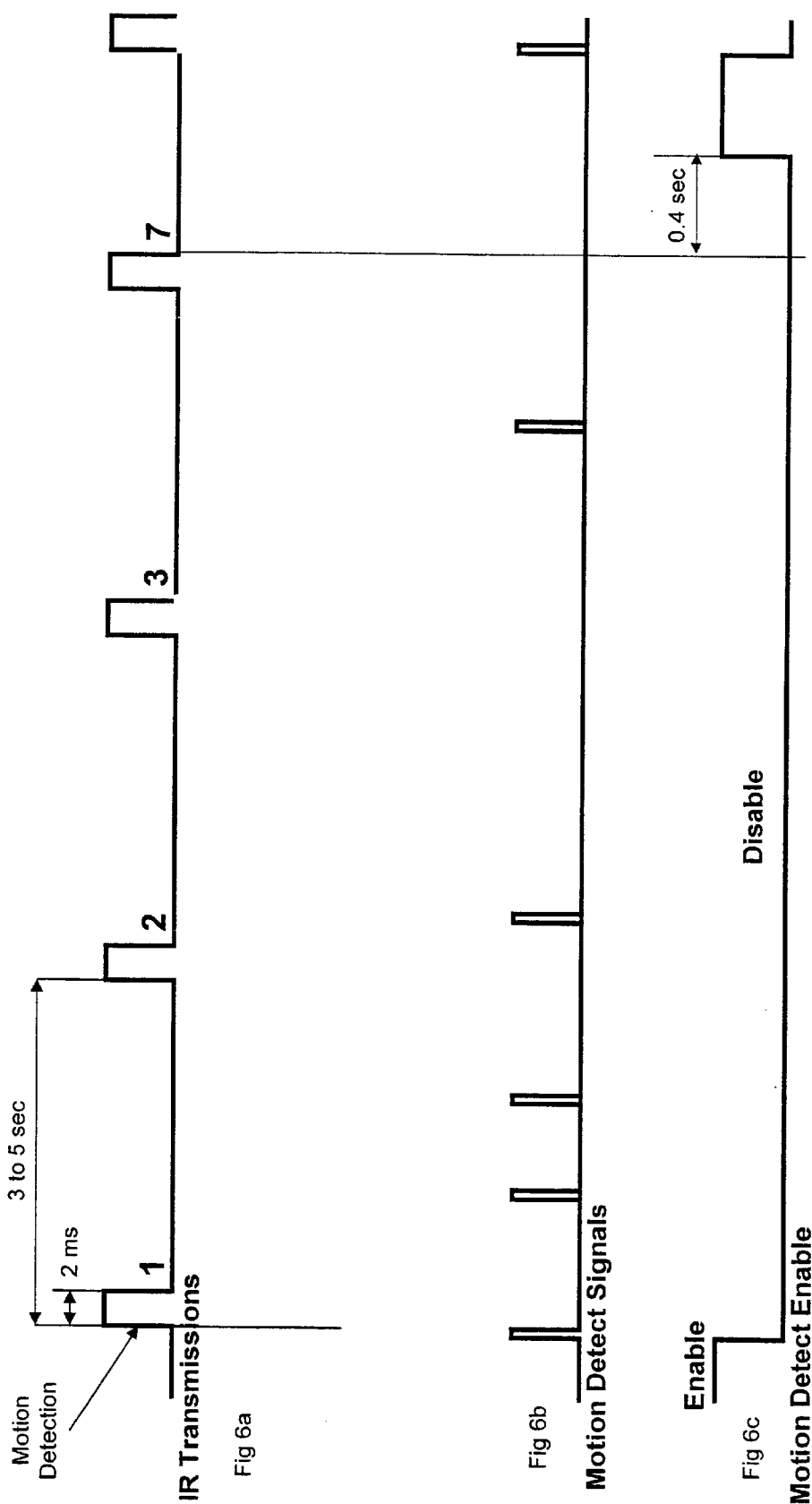
FIG. 6 shows details of the IR communications protocol when the badge is motionless.

FIGS. 6a to 6c show timing diagrams relating to the transmission of IR data by the badge following motion detection. Thus, as shown in FIG. 6a during or following motion of the badge, a cycle of seven IR pulses is transmitted having a random time interval between adjacent signals of 3 to 5 seconds. FIG. 6b shows a plurality of motion detect signals produced consequent to the badge's intermittent movement. As shown in FIG. 6c, the motion detect enable signal returns to the DISABLED state when the first intermittent movement of the badge ceases. Thereafter, it remains DISABLED until termination of the last pulse in the cycle, whereupon is goes back to the ENABLED state. This ensures that once motion has been detected, further motion of the badge during the seven signal cycle of between 21 to 35 seconds is ignored. Were this not the case, intermittent motion of the badge would result in interruptions of the cycle of seven signals thereby rendering the communications protocol unpredictable.

Figure 7:
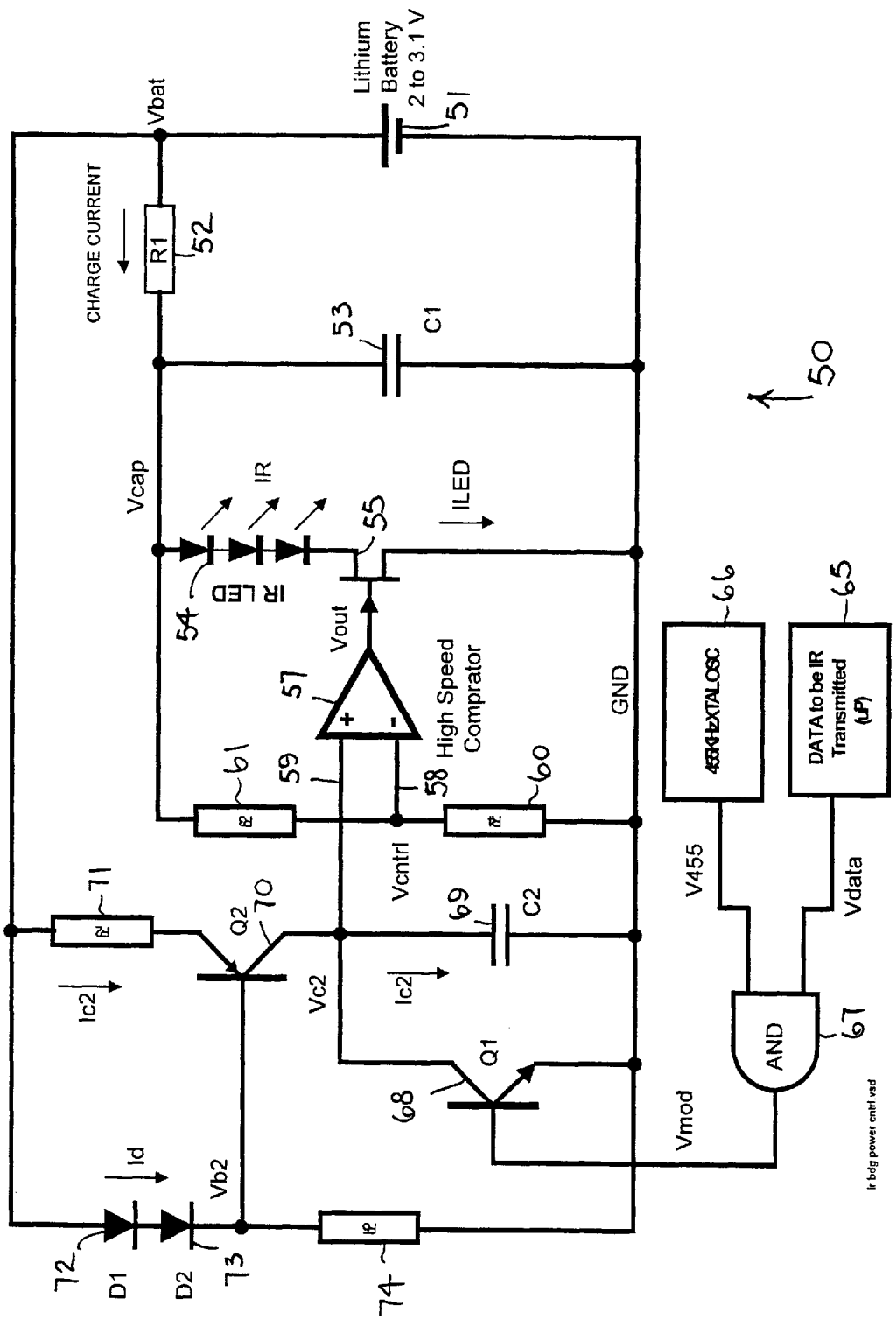
FIG. 7 is a circuit diagram showing schematically details of an IR energy transmission stabilization circuit for use with the badge according to the invention.

FIG. 7 shows schematically details of an energy regulator circuit 50 for stabilizing the IR transmission energy so as to be substantially constant regardless of fluctuations in supply voltage. Thus, a lithium battery 51 having a nominal voltage of between 2 and 3.1 volts charges via a resistor 52 a capacitor 53 (constituting a control capacitor) whose low voltage terminal is connected to ground, GND. The high voltage terminal of the capacitor 53 serves as a positive voltage rail $V_{cap}$. An IR LED array 54 in series with a MOSFET 55 is connected in parallel with the capacitor 53 so that when the MOSFET 55 is in its conductive state, the capacitor 53 discharges through the LED array 54. The The MOSFET 55 constitutes a switch controlled by a voltage on the MOSFETs gate, which is connected to the output 56 of a high speed comparator 57 having an inverting input 58 driven by a control voltage, $V_{cntrl}$ derived by a voltage divider comprising resistors 60 and 61 connected between the positive supply rail $V_{cap}$ and GND. Thus, the control voltage $V_{cntrl}$ is a function of the voltage $V_{cap}$ across the capacitor 53.

Data to be transmitted is derived from a microprocessor 65 and is modulated with a 455 KHz signal generated by a crystal oscillator 66, the data signal and the carrier signal being fed through a 2-input AND gate 67. A modulated signal is thus derived at the output of the AND gate 67 and is fed to the base of an NPN bipolar junction transistor 68 whose emitter is connected to GND and whose collector is connected to the non-inverting input 59 of the high speed comparator 57. A capacitor 69 (constituting a triggering capacitor) is connected between GND and the non-inverting input 59 of the comparator to which is also connected the collector of a PNP bipolar junction transistor 70. An emitter of the transistor 70 is connected via a resistor 71 to the positive terminal of the battery 51. A pair of rectifier diodes 72 and 73 are connected in series with a resistor 74 between GND and the positive supply terminal of the battery 51, a common junction between the diode 73 and the resistor 74 being connected to the base of the transistor 70.

The operation of the circuit will now be explained with reference to FIGS. 8a to 8f and 9a to 9e showing various voltage waveforms associated with critical components in the circuit. FIG. 8a shows the 455 KHz carrier signal produced by the oscillator 66 and FIG. 8b shows the data signal produced by the microprocessor 65. The modulated signal appearing at the output of the AND gate 67, as shown in FIG. 8c comprises high frequency pulses throughout the period that the data signal shown in FIG. 8b is high separated by gaps of zero voltage when the data signal shown in FIG. 8b is low.

The PNP transistor 70 in association with the rectifier diodes 72 and 73 and the resistor 71 acts as a constant current source for feeding a current Ic2 through the capacitor 69. The magnitude of the current Ic2 is equal to the voltage across the resistor 71 divided by the resistance of the resistor 71. The voltage across the resistor 71 is equal to the voltage across the two rectifier diodes 72 and 73 less the base emitter voltage $V_{BE}$ of the transistor 70, and is therefore constant. Furthermore, since both $V_{BE}$ and the forward bias voltage across the rectifier diodes 72 and 73 change in like manner with fluctuations in temperature, the current Ic2 remains substantially temperature-insensitive.

During those periods when the modulated data signal as shown in FIG. 9a is LOW, the NPN transistor 68 is cutoff and the current Ic2 flows through the capacitor 69. As a result, the capacitor 69 charges linearly as shown in FIG. 9band the voltage across the capacitor 69 at any given time t is given by:

$$Vc2 = \left(\frac{Ic2}{C2}\right) \cdot t$$

where C2 is the capacitance of the capacitor 69.

When the voltage Vc2 exceeds the control voltage $V_{cntrl}$ applied to the inverting input 58 of the comparator 57, the comparator 57 feeds the modulated data signal to the gate of the MOSFET 55, which thus conducts thereby allowing current to be fed by the capacitor 53 through the IR LED array 54. During those periods when the modulated data signal as shown in FIG. 9a is HIGH, the NPN transistor 68 goes into saturation, thereby shorting the capacitor 69. In this case, the voltage Vc2 falls to zero and the output of the comparator 57 goes LOW, thereby switching off the MOSFET 55 and preventing the capacitor 53 from discharging through the IR LED array 54.

The magnitude of the control voltage $V_{cntrl}$ is directly proportional to the voltage across the capacitor 53, equal to the positive supply rail $V_{cap}$, in accordance with the voltage divider formed by the resistors 60 and 61. Thus, the magnitude of $V_{cntrl}$ increases as the voltage across the battery 51 is higher and vice versa. When $V_{cntrl}$ is at its maximum, shown as $Vcntrl_{max}$ in FIG. 9b, the capacitor 69 must charge to a higher voltage before the output 56 of the comparator 57 goes HIGH. In this case, the MOSFET 55 conducts for a smaller part of the cycle and the current, $I_{LEDmax}$, flowing through the LED array 54 has only a narrow pulse width $T_{min}$, as shown in FIG. 9d. Conversely, when $V_{cntrl}$ is at its minimum, shown as $Vcntrl_{min}$ in FIG. 9b, the capacitor 69 need charge to only a small voltage before the output 56 of the comparator 57 goes HIGH and the MOSFET 55 starts to conduct. The MOSFET 55 conducts for a longer part of the cycle and the current, $I_{LEDmin}$, flowing through the LED array 54 has a wide pulse width $T_{max}$, as shown in FIG. 9e. Shown in FIG. 9c is an intermediate condition where the control voltage, shown as $Vcntrl_0$, has a value in between $Vcntrl_{max}$ and $Vcntrl_{min}$. In this case, the pulse width of the current $I_{LED0}$, flowing through the LED array 54 has an intermediate pulse width $T_0$.

The energy of the IR data transmitted by the IR LED array 54 is proportional to the current flowing therethrough multiplied by the time duration of the current flow. As the battery 51 discharges, or during the transmission of one pulse train when the capacitor 53 discharges, the voltage $V_{cap}$ across the capacitor 53 diminishes as shown in FIG. 8d. Therefore, the current fed by the capacitor 53 through the IR LED array 54 also decreases. However, since as explained above, the time during which the MOSFET 55 conducts increases as the voltage, $V_{cap}$ decreases, and vice versa, there are two counteracting effects which act to maintain the energy of the IR transmission. The energy is maintained constant throughout the useful life of the battery, or throughout diminishing voltage $V_{cap}$ across the capacitor 53, if:

$ILED_0 \times T_0 = ILED_{max} \times T_{min} = ILED_{min} \times T_{max} = $ constant This requirement can be met by selecting appropriate values for the capacitor 69 and the current Ic2 produced by the constant current source.

What is claimed is:

1. A battery operated IR transmitter comprising at least one IR LED energized by a source of voltage for passing current during transmission of pulses of data, said IR transmitter including an energy regulator for maintaining transmission energy through the at least one IR LED substantially constant regardless of fluctuations in said voltage, wherein the energy regulator includes:

a switch for selectively feeding said pulses of data through the at least one IR LED for a controlled time duration, a control capacitor for charging to a control voltage from said battery when the switch is in a non-conductive state and for discharging through the at least one IR LED when the switch is in a conductive state, a triggering capacitor coupled to a source of constant current for charging linearly to a triggering voltage when the switch is in said non-conductive state, and a triggering circuit coupled to the switch, the control capacitor and the triggering capacitor and being responsive to a difference between the triggering voltage and a predetermined fraction of the control voltage for triggering the switch into the conductive state;

whereby as the control voltage decreases, the triggering capacitor charges to a lower voltage before the switch is triggered into the conductive state and the switch conducts for a longer time thereby increasing the duration of current through the at least one LED array;

said source of constant current and triggering capacitor being preselected so that the product of the current through the at least one LED array and the duration thereof remain substantially constant for a range of control voltages.

2. The IR transmitter according to claim 1, being integral with a portable object transceiver carried by a moving object or person for transmitting a location signal to an IR reader in an IR location system.

3. The IR transmitter according to claim 2, including a micro-controller responsively coupled to a motion sensor for increasing a time interval between pulses when the object transceiver is in motion as compared with when it is stationary, thereby conserving battery power.

4. The IR transmitter according to claim 3, wherein the micro-controller is responsive to a lack of motion of the object transceiver for entering a dormant, power saving mode of operation.

5. The IR transmitter according to claim 3, wherein the pulses have a period of less than 10 ms and the time between pulses varies from several seconds when in motion to scores of seconds when the object transceiver is stationary.

6. The IR transmitter according to claim 4, wherein the pulses have a period of less than 10 ms and the time between pulses varies from several seconds when in motion to scores of seconds when the object transceiver is stationary.

* * * * *